Patented Mar. 3, 1953

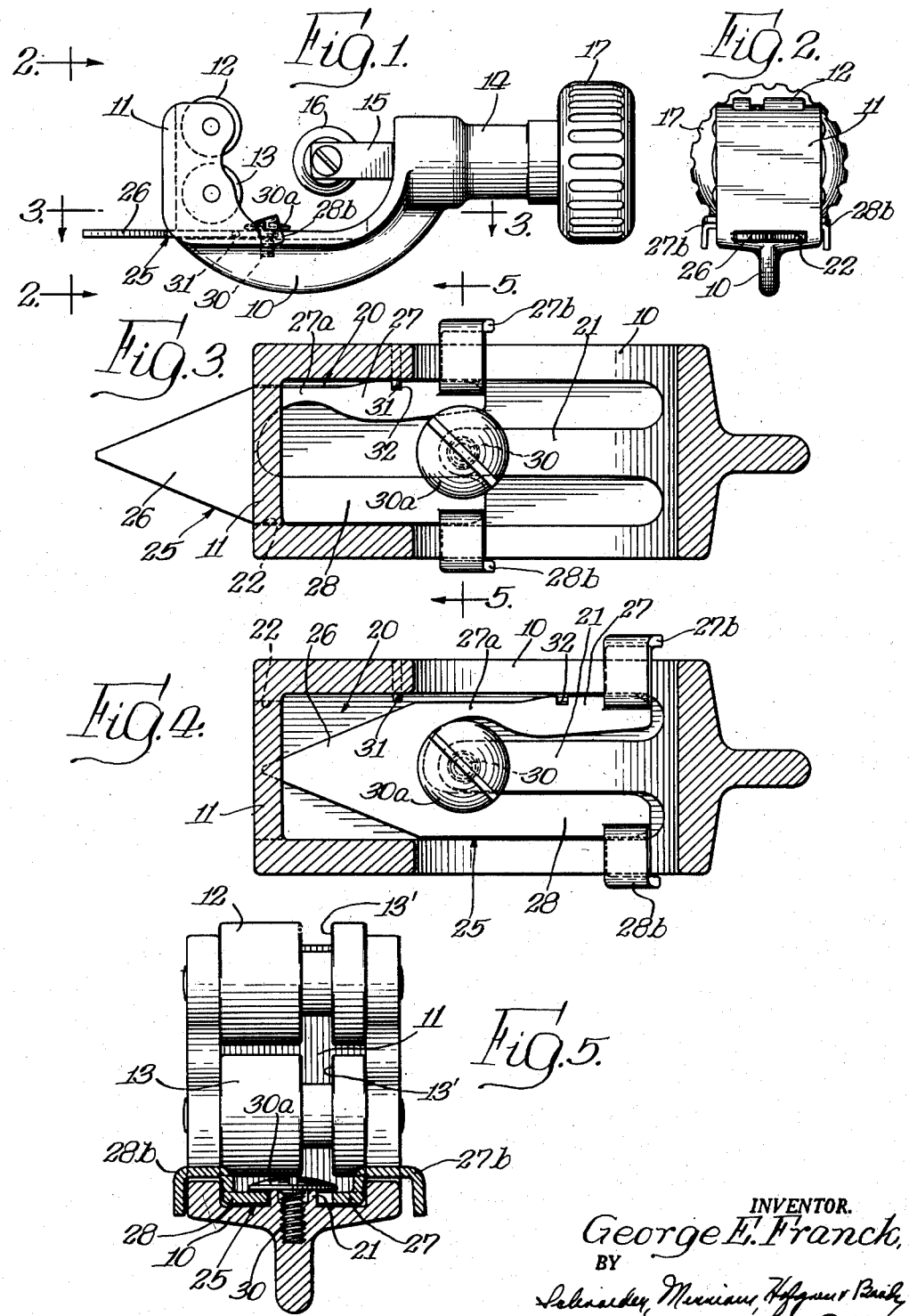

2,630,029

UNITED STATES PATENT OFFICE 2,630,029

COMBINATION TUBE WORKING TOOL AND REAMER

George E. Franck, Riverside, Ill., assignor to The Imperial Brass Manufacturing Company, a corporation of Illinois Application September 9, 1949, Serial No. 114,857

6 Claims. (Cl. 77—73)

This invention relates to a tube working tool and more particularly to a hand operated tool for reaming relatively small tubes.

A general object of the invention is to provide an improved tube working tool.

Another object of the invention is to provide a tube working tool comprising a body member having an elongated guideway with a reamer member slidably mounted in said guideway for movement between retracted position and operating position.

Another object is to provide a tool wherein the reamer member has a guide portion comprising prongs slidable in said guideway on each side of a longitudinal partition therein, together with means for retaining said prongs in said guideway.

Another object is to provide a tool having a guideway with a reamer member slidable therein together with means for locking the reamer on the body member with the blade in operating position.

Another object is to provide a reamer having means thereon projecting out of the guideway on opposite sides of the body member for moving the reamer between retracted and operating positions and for limiting movement of the reamer in one direction.

Another object is to provide a tool as aforesaid having a detent on the body member projecting into the channel therein, one of the prongs on said reamer member having a notch for engaging said detent to lock the reamer in operating position, and the reamer member being so constructed that the notched prong fits loosely in the channel and has a spring portion of reduced width, while the other prong fits closely in said channel for preventing angular movement between the reamer and the body member.

Other objects and advantages of the invention will be apparent from the following specification and the drawings, in which:

Fig. 1 is a side elevational view of a tube working tool embodying the invention, portions of underlying structure being shown in broken lines;

Fig. 2 is an end view looking from the left of Fig. 1;

Fig. 3 is an enlarged horizontal section taken along the line 3—3 of Fig. 1;

Fig. 4 is a section similar to Fig. 3, but with the reamer in retracted position; and Fig. 5 is a vertical transverse section taken along the line 5—5 of Fig. 3.

Small tubing of copper, aluminum, steel and the like is frequently cut on the job by means of a small hand cutter carried by the workman in his pocket or tool kit. Frequently the use of such a tube cutter results in small burrs or even an actual flange in the bore of the tube. In order that the end of the tubing so cut may not be restricted by the flange and in order that a fluid-tight seal can be made with a coupling or fitting, the flange or burrs must be removed by a reaming operation.

A reamer is thus a frequently used tool and one that should be maintained in condition to perform its intended operation easily and efficiently. The blade of the reamer should have both an operative and an inoperative position, in the latter of which the working edges of the reamer blade are protected against injury and dulling and the blade is in an out of the way position avoiding injury to the workman.

The reamer herein disclosed and claimed could be formed as a separate tool or might possibly be combined with any one of several other tools in order to conserve space and reduce the number of tools required to be carried by the workman. Inasmuch, however, as a tube cutting operation is invariably followed by a reaming operation, the reamer herein disclosed and claimed is designed to be incorporated in a single tube working tool with tube cutting means. In that manner the efficiency of a tube cutting and reaming operation is greatly enhanced, the convenience of the workman is served, and a great deal of lost motion and effort in replacing the cutting tool and picking up the reamer is eliminated.

Referring now more particularly to the drawings, the novel reamer structure is shown as being incorporated in a tool having a body member 10 functioning as an operating handle for the reamer and also as the yoke or body portion of a tube cutter. To that end, the body member 10 takes the general shape of a wide and shallow U having one side wall portion or leg 11 adapted to carry a pair of rollers 12 and 13 for supporting a tube which is to be cut. These rollers have grooves or notches 13' for receiving an external flange frequently formed on the end of a tube. The other side or leg of the U-shaped member 10 has a laterally projecting shank portion 14 adapted to serve as a mounting and bearing for a movable cutter-holding member 15 carrying a rotatable cutting wheel or disk 16 at its inner end. The member 15 is movable longitudinally of the shank 14 by means of a rotatable handle or hand wheel 17 for progressively feeding the cutting disk 16 deeper into a piece of tubing supported on the rollers 12 and 13 as the tool as a whole is revolved about the tube to be cut.

To provide a protected location for the reamer blade when in retracted position, the inner face of the base or connecting portion of the U-shaped body member 10 is formed with an elongated guideway, generally designated 20 in Figs. 3 and 4, and formed by a channel having a centrally disposed partition 21 extending longitudinally therein throughout the major portion of the length of the channel and a passageway 22 (Fig. 2) extending as a continuation of the channel through the side wall 11 of the body member.

A reamer member designated generally at 25 is slidably mounted in the guideway, said reamer member having a pointed blade portion 26 movable between retracted position, wherein it is substantially housed in the guideway as shown in Fig. 4, and operating position, wherein it projects out of the guideway as shown in Fig. 3. Integral with the blade portion 26 is a guide portion comprising a pair of prongs 27 and 28 slidable in the channel on each side of the partition 21. As shown best in Figs. 3 and 4, the prong 27 is constructed to fit loosely in the channel on one side of the partition and has a spring portion 27a of reduced width, while the prong 28 is constructed to fit closely in the channel for limiting angular movement between the reamer member and the body member 10. Each prong has an ear formed integrally therewith and designated at 27b and 28b, respectively. These ears project out of the guideway on opposite sides of the body member and provide means for moving the reamer between the positions of Figs. 3 and 4. Furthermore, when the reamer is in the position of Fig. 3 (see also Fig. 1), the ears engage the sloping inner surface of the side wall portion 11 and limit movement of the reamer in one direction.

In order to retain the reamer in the guideway in the body member, a stud 30 is threaded into the partition near the end thereof, this stud having an enlarged head 30a overlying the prongs of the reamer and forming means for retaining the prongs in the channel of the guideway.

Means is also provided for locking the reamer with the blade in operating position. A detent 31 on the body member 10 projects into the channel between the stud 30 and the passage 22, and the spring prong 27 has a notch 32 for engaging the detent to lock the blade in operating position.

In the operation of the device, and as an illustration of the most common type of use of the device, the reamer 25 normally is placed in the retracted position of Fig. 4 wherein the blade is substantially entirely housed in the guideway in the body member. With the parts in this position, the tool can be used as a tube cutter with no inconvenience caused by the presence of the reamer, and, whether the tool is in use or whether it is being carried in the pocket of a workman, the pointed reamer blade is withdrawn and the tool may be safely used or carried without danger of injury by or to the blade. When the workman desires to use the reamer, as for example to remove the burr from the bore of a tube which he has cut, it is merely necessary for him to grasp the ears 27 and 28 between his thumb and forefinger and slide the reamer toward its operating position. This sliding movement and the yieldability of the spring portion will cause the notch 32 to engage the detent 31 just before the ears engage the sloping surface of the end portion 11 of the body member to limit the longitudinal movement between the parts. Engagement of the detent and notch locks the reamer in the operating position of Fig. 3, and angular movement of the reamer relative to the body member is prevented by the close fit of the guide prong 28 of the reamer in the channel of the guideway and by engagement of the reamer faces with the walls of the passage 22 of the guideway. With the parts in this position, the tool may be grasped by the workman and the burr may be reamed from the tube. The operating handle 17 seats in the palm of the workman's hand and the body portion may be grasped in the fingers of the workman to provide a very efficient reaming tool.

After the reaming operation has been performed, the ears are grasped and squeezed together, the spring portion 27a of the prong 27 yielding to disengage the notch and detent. With the parts in this position the reamer may be slid back to the retracted position of Fig. 4 and the tool may be carried safely or it may be utilized as a tube cutter with safety and without inconvenience caused by the presence of the reamer.

While I have shown and described certain embodiments of my invention, it is to be understood that it is capable of many modifications. Changes, therefore, in the construction and arrangement may be made without departing from the spirit and scope of the invention as disclosed in the appended claims.

I claim as my invention:

1. A tube working tool comprising an elongated body member having an angularly extending end wall said body member having an elongated guideway formed by a channel with a partition extending longitudinally therein and a passage at one end through a section of said wall near the bottom thereof; a reamer member slidably mounted in said guideway, said reamer member having a blade portion movable between retracted position wherein it is substantially entirely housed in said guideway and an operating position wherein it projects out of said passage, and said reamer member having a guide portion comprising prongs slidable in said channel on each side of said partition; and a stationary detent on said body member projecting into said channel, one of said prongs having a notch for engaging said detent to lock said blade in operating position.

2. Apparatus of the character claimed in claim 1, wherein the notched prong fits loosely in said channel and has a spring portion of reduced width, and wherein the other prong fits closely in said channel for preventing angular movement between said reamer and said body member.

3. A tube working tool comprising an elongated body member having an angularly extending end wall, said body member having an elongated guideway formed by a channel with a centrally disposed partition extending longitudinally therein throughout a portion of the length of said channel and a passage at one end through said wall; a reamer member slidably mounted in said guideway, said reamer member having a blade portion movable between retracted position wherein it is substantially entirely housed in said guideway and an operating position wherein it projects out of said passage, and said reamer member having a guide portion comprising prongs slidable in said channel on each side of said partition; a stud mounted on said partition, said stud having an enlarged head portion forming means for retaining said prongs in said channel; and a stationary detent on said body member projecting into said channel, one of said prongs having a notch for engaging said detent to lock said blade in operating position.

4. A tube working tool comprising an elongated body member formed as a U having an angularly extending side wall, the inner face of the connecting portion of said body member having an elongated guideway formed by a channel with a centrally disposed partition extending longitudinally therein throughout a portion of the length of said channel and a passageway extending as a continuation of the channel through a side wall; a reamer member slidably mounted in said guideway, said reamer member having a blade portion movable between retracted position wherein it is substantially entirely housed in said guideway and an operating position wherein it projects out of said passage, and said reamer member having a guide portion comprising prongs slidable in said channel on each side of said partition; a stud mounted on said partition, said stud having an enlarged head portion forming means for retaining said prongs in said channel; a detent on said body projecting into said channel, one of said prongs having a notch for engaging said detent to lock said blade in operating position, the notched prong fitting loosely in said channel on one side of said partition and having a spring portion of reduced width, and the other prong fitting closely in said channel on the other side of said partition for preventing angular movement between said reamer and said body member; and means on said reamer projecting out of said guideway for moving said reamer between said two positions and for limiting movement of said reamer in one direction.

5. A tube working tool comprising an elongated body member formed as a U having an angularly extending side wall, the inner face of the connecting portion of said body member having an elongated guideway formed by a channel with a centrally disposed partition extending longitudinally therein throughout a portion of the length of said channel and a passageway extending as a continuation of the channel through a side wall; a reamer member slidably mounted in said guideway, said reamer member having a blade portion movable between retracted position wherein it is substantially entirely housed in said guideway and an operating position wherein it projects out of said passage, and said reamer member having a guide portion comprising prongs slidable in said channel on each side of said partition; a stud mounted on said partition adjacent the end thereof, said stud having an enlarged head portion forming means for retaining said prongs in said channel; a detent on said body projecting into said channel, one of said prongs having a notch for engaging said detent to lock said blade in operating position, the notched prong fitting loosely in said channel on one side of said partition and having a spring portion of reduced width, and the other prong fitting closely in said channel on the other side of said partition for preventing angular movement between said reamer and said body member; and an ear on each prong projecting out of said guideway on opposite sides of said body member for moving said reamer between said two positions, said ears engaging said end wall for limiting movement of said reamer in one direction.

6. A tube working tool comprising a body member having an elongated guideway formed by a channel, a reamer member having a blade portion movable between retracted position wherein it is substantially entirely housed in said guideway and operating position wherein it projects out of said guideway, said guideway being substantally as long as said reamer member and said reamer member having a guide portion comprising prongs slidable in said channel, a headed stud for retaining said prongs slidably in said channel projecting between said prongs and secured in said body member, at least one of said prongs being resiliently yieldable transversely of the direction of movement of said reamer member, a stationary detent on the body member projecting into the channel from the side thereof adjacent said resilient prong, and a notch on the outside edge of said resilient prong for receiving said detent when said blade is in operating position.

GEORGE E. FRANCK.

REFERENCES CITED

The following references are of record in the file of this patent:

UNITED STATES PATENTS

| Number | Name | Date |
|---|---|---|
| 515,742 | Von Biiltzingslowen | Mar. 6, 1894 |
| 621,305 | Kaiser | Mar. 14, 1899 |
| 902,387 | Fegley | Oct. 27, 1908 |
| 1,531,160 | Toomey | Mar. 24, 1925 |
| 1,577,880 | Stuart | Mar. 23, 1926 |
| 1,906,573 | Gits | May 2, 1933 |
| 1,940,855 | Friedman | Dec. 26, 1944 |

FOREIGN PATENTS

| Number | Country | Date |
|---|---|---|
| 102,546 | Germany | Apr. 26, 1899 |